May 31, 1938.  J. A. JENSEN  2,119,331
PIPE COUPLING
Original Filed July 1, 1933
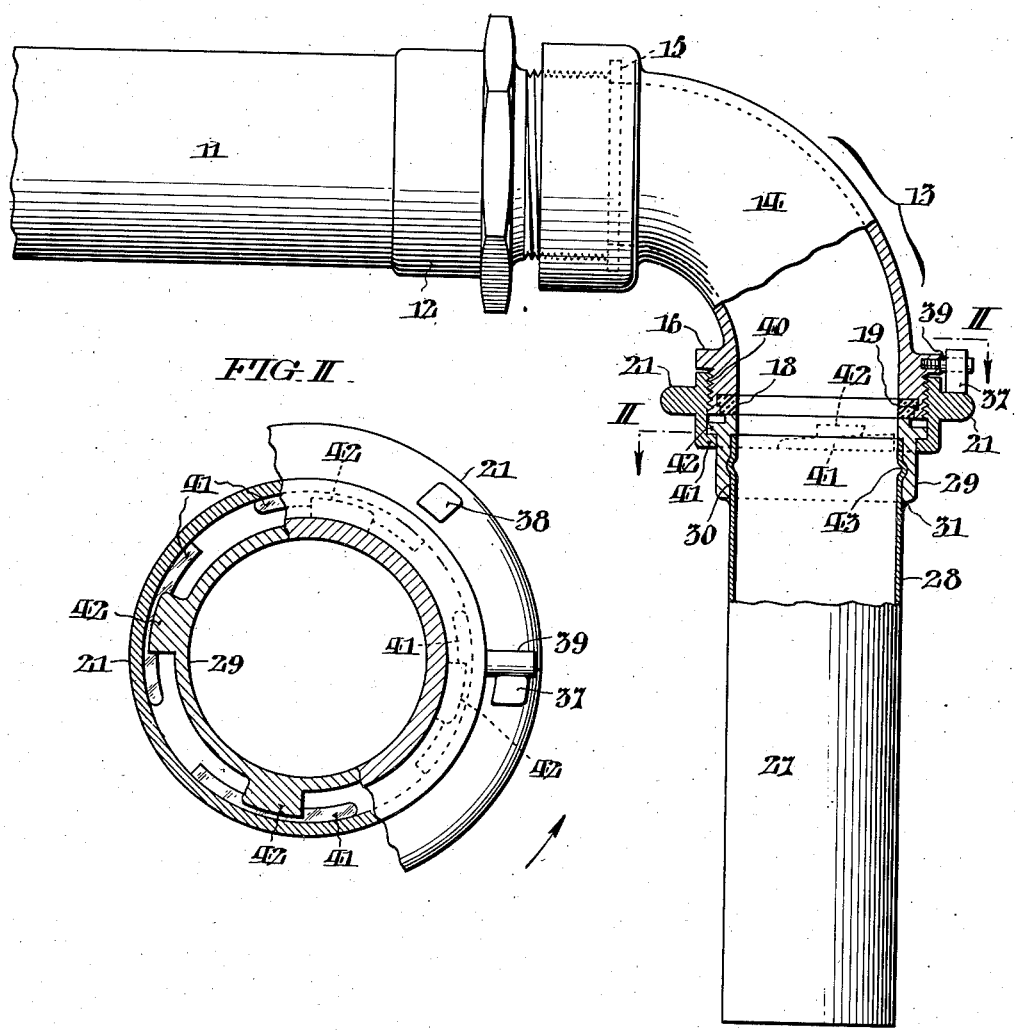
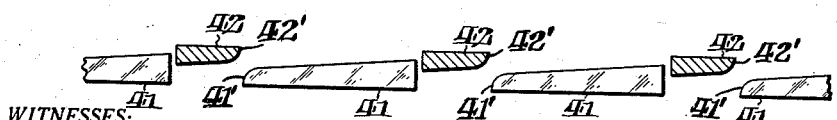
WITNESSES:
INVENTOR:
James A. Jensen,
BY
ATTORNEYS.

Patented May 31, 1938

2,119,331

UNITED STATES PATENT OFFICE 2,119,331

PIPE COUPLING

James A. Jensen, Philadelphia, Pa., assignor to Quaker City Iron Works, Philadelphia, Pa., a corporation of Pennsylvania Original application July 1, 1933, Serial No. 678,619, now Patent No. 2,006,833, dated July 2, 1935. Divided and this application June 29, 1935, Serial No. 28,985

2 Claims. (Cl. 285—175)

This invention relates to hose nozzles; and it has more particular reference to nozzles for the drain hoses of vehicles such as are ordinarily used in the delivery of gasoline, oils and other liquid commodities; and this application is a division of my prior application filed July 1, 1933; under Serial Number 678,619, and which later matured as Patent No. 2,006,833 dated July 2, 1935.

Considered from the broadest aspect, my invention has for its primary object the provision of a simple and inexpensive terminal fitting for the drain hose of gasoline delivery vehicles and the like, with tips having identical heads which can be interlocked fluid-tight to said fitting with the utmost facility and quickness or as quickly removed therefrom, and without requiring the aid of any tools whatever.

An advantage of my novel hose nozzle is that it positively ensures quick attachment and detachment of the nozzle tips by partial rotation of one of the parts only.

Other objects and attendant advantages of this invention will be manifest from the following detailed description of the accompanying drawing wherein Fig. I is a fragmentary view partly in side elevation and partly in section showing my improved hose terminal-fitting and nozzle in one form in which it may be embodied.

Fig. II is a staggered horizontal sectional view taken as indicated by the arrows II—II in Fig. I.

Fig. III is a diagrammatic view showing a development of cooperating elements whereby the nozzle tip is removably secured to the terminal-fitting of the nozzle.

Referring to the embodiment of my invention shown in Figs. I to III, the numeral 11 designates a flexible hose such as is used on vehicles employed in the delivery of gasoline, oils and other liquid commodities, the same being fitted at its end with a threaded nipple 12. My improved hose nozzle which is comprehensively indicated at 13 comprises a terminal member in the form of an elbow 14 which, as shown in Fig. I, screws onto the threaded nipple 12 with interposition of a compressible ring washer 15 to prevent leakage around the juncture. The mouth end of the elbow 14 is enlarged as at 16 and formed internally with a circumferential groove 19 for lodgment of the peripheral flange of an annular gasket 18. In practice, this gasket 18 is made from a soft resilient material which is resistive to erosion by the liquid commodities being carried.

For interchangeable use with the body member 14 of the nozzle I provide a number of tips whereof one is shown, for the purposes of exemplification in the present instance, and designated 27 in Fig. I. It will be observed that the nozzle tip 27 has a head 29 which is counter-bored as at 30 to receive the prolongation 28 of said tip, the latter being in practice cut from tubing of alloy bronze or other suitable non-corrosive metal capable of withstanding rough usage. After assembling the parts of the tip 27, they are permanently secured together by soldering or welding preferably at 31 immediately beneath the head 29.

In the form of my invention shown in Figs. I-III, a wedge or coupler ring 21 has threaded engagement with the mouth end 16 of the elbow 14 at 40; and said ring is provided around its bottom edge with a series of circumferentially spaced inwardly projecting wedge-shaped cam lugs 41 having rounded ends 41', Fig. III, which are adapted to cooperate individually with opposing outwardly projecting wedge-shape cam lugs 42 similarly with rounded ends 42', and spaced around the top end of the head 29 of the nozzle tip 27. In applying the tip 27 it is positioned circumferentially so that its cam lugs 42 may be passed upward into the intervals between the cam lugs 41 on the wedge ring 21 incident to insertion of the head 29 of said tip into the mouth 16 of the elbow 14. With the parts placed in the described relation, the wedge coupler ring 21 is given a partial anti-clockwise rotation, or as indicated by the arrow in Fig. II, whereby its cam lugs 41 are moved circumferentially beneath the lugs 42 on the elbow ring 21, such action being initially facilitated by coaction of the respective lug rounded ends 41', 42'. As a consequence of the wedge action between the lugs 41, 42 it will be apparent from Fig. I that the nozzle tip 27 will be lifted or drawn inwardly somewhat, with resultant compression of the gasket 18 and formation of a fluid-tight seal at the juncture between the tip 27 and the elbow 14. It is to be noted that the lugs 42 are considerably shorter than the lugs 41, and that their respective confronting faces are similarly inclined; but, obviously, the circumferential extent of said lugs may be reversed or otherwise proportioned as deemed advisable or found expedient in practice. Also, the ring 21 is formed with a pair of upward circumferentially-spaced lugs 37, 38 that cooperate with a lateral stud projection 39 on the elbow 14 to limit the extent of rotation of said ring. In addition to being soldered to the head 29 of the tip 27 at 31, the tubular prolongation 28 is in this instance expanded, as at 43, into an internal circumferential groove of the head 29. This construction will insure against separation of the component parts of the nozzle in case of failure of the solder at 31.

From the foregoing it will be seen that the interchangeable nozzle tips are quickly attachable and detachable through a partial rotation of one part relative to the other.

Having thus described my invention, I claim:

1. In a hose nozzle of the character described, a hollow body member having one end adapted for application to the hose, with an annular gasket of resilient material lodged internally of the other or mouth end; a tip with a headed prolongation for insertion in the body member mouth end to abut the gasket therein, said tip having circumferentially-directed outwardly-projecting wedge-section lugs; a coupler ring embracing the mouth end of the body member having a corresponding number of similarly located inwardly-projecting wedge-section lugs adapted, upon a partial rotation of said coupler ring, to coact with the first mentioned lugs and effect axial movement inwardly of the tip only into interlocking connection with the body member and fluid-tight engagement with the gasket aforesaid.

2. The combination of claim 1 wherein the tip head and coupler lugs are of different circumferential length, the confronting faces of said lugs are correspondingly inclined, and the coupler is screw-threaded to the body member with means limiting its rotation whereby the hose nozzle tip is urged inwardly and interlocked to said body member solely by combined axial progression of the screw thread and inclined coaction of the lugs.

JAMES A. JENSEN.